United States Patent
Chiba et al.

(10) Patent No.: US 9,005,502 B2
(45) Date of Patent: Apr. 14, 2015

(54) MOLD AND MANUFACTURING METHOD THEREOF

(75) Inventors: Tsuyoshi Chiba, Tokyo (JP); Hiroshi Fujita, Tokyo (JP); Yuki Aritsuka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 148 days.

(21) Appl. No.: 13/405,996

(22) Filed: Feb. 27, 2012

(65) Prior Publication Data

US 2012/0223454 A1    Sep. 6, 2012

(30) Foreign Application Priority Data

Mar. 3, 2011    (JP) ................. 2011-046130

(51) Int. Cl.
- *B29C 33/40* (2006.01)
- *B29C 33/64* (2006.01)
- *B82Y 10/00* (2011.01)
- *B29C 33/42* (2006.01)

(52) U.S. Cl.
CPC .............. *B29C 33/40* (2013.01); *B29C 33/405* (2013.01); *B29C 33/64* (2013.01); *B82Y 10/00* (2013.01); *B29C 33/424* (2013.01); *B29K 2883/00* (2013.01)

(58) Field of Classification Search
CPC ....... G03F 7/0002; G03F 1/14; G03F 7/0017; G03F 9/7042; B29K 2883/00; C08L 83/04; B82Y 10/00; B82Y 40/00; B29C 33/60; B29C 33/62; B29C 33/64; B29C 33/40; B29C 33/405; B29C 33/424; B29C 33/426; B29C 33/3842; B29C 33/3857
USPC ................ 264/219, 220, 225, 226, 293, 496; 249/114.1, 115; 425/385, 470; 428/332, 447; 977/887
See application file for complete search history.

(56) References Cited

U.S. PATENT DOCUMENTS

| | | | |
|---|---|---|---|
| 4,534,928 A * | 8/1985 | Martin | 264/334 |
| 2002/0050220 A1 * | 5/2002 | Schueller et al. | 101/486 |
| 2003/0064232 A1 * | 4/2003 | Allen et al. | 428/447 |
| 2006/0290025 A1 * | 12/2006 | Chae et al. | 264/219 |

FOREIGN PATENT DOCUMENTS

JP    A-2002-353436    12/2002

OTHER PUBLICATIONS http://en.wikipedia.org/wiki/Polydimethylsiloxane; Feb. 28, 2010;.*

* cited by examiner

*Primary Examiner* — Monica Huson
*Assistant Examiner* — Hannuri L Kwon
(74) *Attorney, Agent, or Firm* — Oliff PLC (57) ABSTRACT

The object of the invention is to provide a mold that is capable of high-precision, stable patterning, and improved in terms of handleability as well, and a manufacturing method thereof. The mold of the invention has a pattern-formation surface defined by one surface, wherein the pattern-formation layer has a projection-and-depression structure area for patterning, and a base surface defined by another surface. At least the pattern-formation layer and the base surface each comprise a polydimethylsiloxane layer. Given a low-molecular-weight siloxane of a cyclic structure represented by $[-Si(CH_3)_2 O-]_k$ where k is an integer of 3 to 20 inclusive, the polydimethylsiloxane layer positioned on the pattern-formation layer comprises a high-content polydimethylsiloxane layer containing the low-molecular-weight siloxane in a larger amount, and the polydimethylsiloxane layer positioned on the base surface comprises a low-content polydimethylsiloxane layer containing the low-molecular-weight siloxane in a smaller amount.

8 Claims, 4 Drawing Sheets

MOLD AND MANUFACTURING METHOD THEREOF

BACKGROUND OF THE INVENTION

The present invention relates to a mold for the formation of any desired pattern (such as lines and graphic patterns) on workpieces, and a manufacturing method thereof.

So far, there has been a pattern-formation process known in the art, in which a fluid material such as polydimethylsiloxanes is cast onto a master template, and let be cured there to prepare a mold having a fine stereoscopic structure, and this mold is used to form a fine pattern of the micro- or nano-order on a workpiece such as a resinous material by means of microcontact printing or imprinting (JP(A) 2002-353436).

A problem with such mold manufacturing has been, however, that the mold peeled off the master template has handling difficulty in later steps such as an inspection step because of its extreme softness.

This handling problem could be overcome if, after the casting of polydimethylsiloxane or other suitable material onto the master template, the material is cured while a support substrate is engaged with it to form a mold on that support substrate. However, this has led to another problem that the polydimethylsiloxane or other suitable material remains sticking to the support substrate in the curing stage, rendering the peeling of the support substrate off the mold difficult.

With conventional molds prepared using polydimethylsiloxane or other suitable material, there has also been a problem that when patterning is implemented with the mold held abutting on a silicon-containing substrate such a glass, quartz, or silicon substrate, or when the mold is placed and stored on that silicon-containing substrate for an extended period of time, it remains sticking to the silicon-containing substrate, offering a problem with handleability and stability.

DISCLOSURE OF THE INVENTION

An object of the invention is to provide a mold that is capable of high-precision, stable patterning and makes sure good handleability as well, and a manufacturing method thereof.

According to the invention, such an object is accomplished by the provision of a mold having a pattern-formation surface defined by one surface, in which said pattern-formation surface has a projection-and-depression structure area, and a base surface defined by another surface, wherein at least said pattern-formation surface and said base-surface each comprise a polydimethylsiloxane layer, and given a low-molecular-weight siloxane of a cyclic structure represented by $[-Si(CH_3)_2O-]_k$ where k is an integer of 3 to 20 inclusive, the content of said low-molecular-weight siloxane in said polydimethylsiloxane layer positioned on said pattern-formation surface is more than the content of said low-molecular-weight siloxane in said polydimethylsiloxane layer positioned on said base surface.

In one embodiment of the invention, said polydimethylsiloxane layer positioned on said pattern-formation surface comprises a high-content polydimethyl-siloxane that contains said low-molecular-weight siloxane in an amount of 2,000 ppm or more, and said polydimethyl-siloxane layer positioned on said base surface comprises a low-content polydimethylsiloxane that contains said low-molecular-weight siloxane in an amount of 1,000 ppm or less.

In another embodiment of the invention, the polydimethylsiloxane layer positioned on said base surface has a thickness in the range of 0.005 to 5 mm.

In yet another embodiment of the invention, the angle of contact with water of the polydimethylsiloxane layer positioned on said pattern-formation surface is 100° or greater.

Because the polydimethylsiloxane layer positioned on the pattern-formation surface comprises the high-content polydimethylsiloxane, such an inventive mold as described above makes sure good releasability from resinous materials or the like used for patterning by microcontact printing or imprinting, and enables high-precision patterning to be implemented in a stabilized manner. In addition, the polydimethylsiloxane layer positioned on the base surface, because of comprising the low-content polydimethylsiloxane, is of so low reactivity to a silicon-containing substrate such as a glass, quartz or silicon substrate that even when the mold is placed and stored with the base surface held abutting onto it, the mold is prevented from sticking to it, and even when patterning is implemented with the mold held in place and the base surface kept abutting onto the silicon-containing substrate, the mold is prevented from sticking to it, making sure good handleability and stability.

The invention disclosed herein also provides a manufacturing method of a mold comprising a step of, given a low-molecular-weight siloxane of a cyclic structure represented by $[-Si(CH_3)_2O-]_k$ where k is an integer of 3 to 20 inclusive, coating a support substrate with a low-content polydimethylsiloxane containing said low-molecular-weight siloxane in a smaller amount to form a coating film for a polydimethylsiloxane layer for making up a base surface of the mold, a step of feeding a high-content polydimethylsiloxane containing said low-molecular-weight siloxane in a larger amount onto said coating film for the polydimethylsiloxane layer and pressing a master template against said high-content polydimethylsiloxane thereby forming between said coating film for the polydimethylsiloxane layer for making up the base surface and said master template a coating film for a polydimethylsiloxane layer for making up a pattern-formation surface of the mold, a step of curing the coating film for the polydimethylsiloxane layer for making up the base surface and the coating film for the polydimethylsiloxane layer for making up the pattern-formation surface into a mold, after which said master template is released from said pattern-formation surface of the mold, and a step of releasing said support substrate from said base surface of the mold.

In one embodiment of the invention, said low-content polydimethylsiloxane contains said low-molecular-weight siloxane in an amount of 1,000 ppm or less, and said high-content polydimethylsiloxane contains said low-molecular-weight siloxane in an amount of 2,000 ppm or more.

In such an inventive mold manufacturing method as described above, the coating films for the polydimethyl-siloxane layers are cured between the support substrate and the master template into the mold, and the master template is released from the pattern-formation surface side of the mold so that the mold can be kept on the support substrate. Thus, even when the mold itself is very soft, it can easily be handled in later steps such as an inspection step. In addition, the base surface of the mold in contact with the support substrate comprises the low-content polydimethylsiloxane; so in a step where there is no need for the support substrate any longer, the support substrate can easily be released from the mold, ensuring that the inventive mold can be manufactured.

DETAILED EXPLANATION OF THE INVENTION

Some embodiments of the invention will now be explained with reference to the accompanying drawings.

[Mold]

Figure 1:
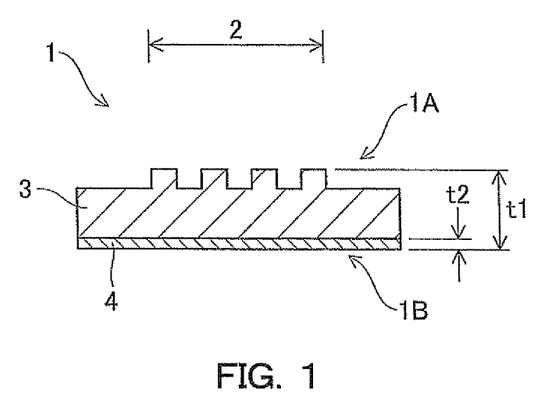
FIG. 1 is a sectional view showing one embodiment of the mold according to the invention.

FIG. 1 is illustrative in section of one embodiment of the mold according to the invention. As shown in FIG. 1, an inventive mold shown generally by reference numeral 1 has a pattern-formation surface 1A defined by one surface, wherein the pattern-formation surface 1A includes a projection-and-depression structure area 2 for patterning, and a base surface 1B defined by another surface. At least the pattern-formation surface 1A and the base surface 1B each comprise a polydimethylsiloxane layer. In a specific example shown in FIG. 1, there is a double-layer structure provided comprising a polydimethylsiloxane layer 3 positioned on the pattern-formation surface 1A side and a polydimethylsiloxane layer 4 positioned on the base surface 1B side.

In the invention disclosed herein, the low-molecular-weight siloxane should have a cyclic structure represented by [—Si(CH$_3$)$_2$O—]$_k$ where k is an integer of 3 to 20 inclusive, and it has now been found that such a low-molecular-weight siloxane is of more reactivity to silicon-containing substrates than a high-molecular-weight siloxane, and depending on the content of the low-molecular-weight siloxane, releasability from resinous materials used for patterning by imprinting or microcontact printing, and reactivity to silicon-containing substrates are controllable. And then, the invention uses the high-content polydimethylsiloxane containing said low-molecular-weight siloxane in a larger amount for the polydimethylsiloxane layer 3 positioned on the pattern-formation surface 1A, and the low-content polydimethylsiloxane containing said low-molecular-weight siloxane in a smaller amount for the polydimethylsiloxane layer 4 positioned on the base surface 1B. More specifically, the polydimethylsiloxane layer 3 positioned on the pattern-formation surface 1A comprises the high-content polydimethylsiloxane that contains said low-molecular-weight siloxane in an amount of 2,000 ppm or more, preferably 5,000 to 30,000 ppm, and the polydimethylsiloxane layer 4 positioned on the base surface 1B comprises the low-content polydimethylsiloxane that contains said low-molecular-weight siloxane in an amount of 1,000 ppm or less, preferably 0 to 500 ppm. It is to be noted that the low-molecular-weight siloxane content herein may be measured and detected by gas chromatography after extraction by acetone. Throughout the disclosure, the same holds true for the low-molecular-weight siloxane and its content.

As the content of the low-molecular-weight siloxane in the polydimethylsiloxane layer 3 positioned on the pattern-formation surface 1A of the mold 1 is less than 2,000 ppm, it is not preferable in that the angle of contact with water of the pattern-formation surface 1A may become less than 100°, rendering releasability for resinous materials used for patterning insufficient and making stable patterning more difficult. As the content of the low-molecular-weight siloxane in the polydimethyl-siloxane layer 4 positioned on the base surface 1B of the mold 1 is greater than 1,000 ppm, it is again not preferable in that in the manufacturing step of the mold 1 or in the processing step or storage state of the mold 1, the polydimethylsiloxane layer 4 (base surface 1B) may remain sticking to an associated abutting substrate, for instance, a silicon-containing substrate such as a glass, quartz or silicon substrate.

It is here to be noted that the value of the angle of contact with water is found by an angle-of-contact meter (CA-Z Model made by Kyowa Interface Science Co., Ltd.) 30 seconds after water is added dropwise through a micro-syringe down onto a pattern-free sample site (outside the projection-and-depression structure area) at a temperature of 25° C. and a humidity of 30% under atmospheric pressure.

The thickness t1 of the inventive mold 1 may optionally be set in consideration of the shape of the projection-and-depression structure, handleability, etc.; for instance, it may optionally be selected from the range of about 0.5 to 10 mm, preferably about 0.7 to 10 mm. As the thickness t1 of the mold 1 is less than 0.5 mm, it makes mold manufacturing difficult because the high viscosity of the raw material polydimethylsiloxane causes the mold thickness to get uneven in the manufacturing step, and makes it likely for the mold to rupture upon peeling off the support substrate at the time of manufacturing. As the thickness t1 of the mold 1 is greater than 10 mm, on the other hand, it is not preferable in that there is a precision drop at the time of patterning by imprinting or microcontact printing.

The thickness t2 of the polydimethylsiloxane layer 4 positioned on the base surface 1B of the mold 1 may be selected from the range of 0.005 to 5 mm, preferably 0.05 to 1 mm. As the thickness t2 of the polydimethylsiloxane layer 4 is less than 0.005 mm, there is a growing likelihood that some of the polydimethylsiloxane layer 4 may have defects, resulting possibly in the inability to cover the polydimethylsiloxane layer 4 comprising the low-content polydimethyl-siloxane all over the base surface 1B of the mold 1. As the thickness t2 of the polydimethylsiloxane layer 4 is greater than 5 mm, it is not preferable in that the effect of the polydimethyl-siloxane layer 4 would not be enhanced any longer, and the manufacturing cost of the mold 1 would rise as well.

There is no particular limitation on the thickness of the polydimethylsiloxane layer 3 positioned on the patter-formation surface 1A of the mold 1, because it is determined as the thickness t1 of the mold 1 and the thickness t2 of the polydimethylsiloxane layer 4 positioned on the base surface 1B are determined. The aforesaid mold 1 of the double-layer structure is given by way of example alone; what is essentially needed herein is that there is the polydimethylsiloxane layer 3 comprising the high-content polydimethylsiloxane present on the pattern-formation surface 1A and the polydimethylsiloxane layer 4 comprising the low-content polydimethylsiloxane on the base surface 1B. Between the polydimethylsiloxane layers 3 and 4, therefore, materials different from the high-content and low-content polydimethylsiloxanes may exist without departing from the purpose of the invention. It is here to be noted that for the convenience of explanation, the terminology "layer" is used to tell the polydimethylsiloxane layer 3 from the polydimethylsiloxane layer 4; however, the invention disclosed herein should not be interpreted as being limited to what is illustrated in the drawings. To put it another way, the mold according to one embodiment of the invention also embraces a modification in which the boundary between the polydimethylsiloxane layers 3 and 4 is too ambiguous to discern them as "layers".

Because the polydimethylsiloxane layer 3 positioned on the pattern-formation surface 1A comprises the high-content polydimethylsiloxane, such inventive mold 1 is improved in terms of releasability from resinous materials or the like used for patterning by microcontact printing or imprinting, so it makes sure high-precision, stable patterning. Also, because the polydimethyl-siloxane layer 4 positioned on the base surface 1B comprises the low-content polydimethylsiloxane, the mold 1 is of low reactivity to a silicon-containing substrate such as a glass, quartz or silicon substrate so that when the mold is placed and stored with its base surface abutting upon that substrate, it is prevented from sticking thereto, and even when the mold is held while its base surface abuts upon the silicon-containing substrate for the purpose of patterning, it is kept against sticking thereto, making sure good handleability and stability.

The aforesaid embodiments are given by way of example but not by way of limitation.

[Manufacturing Method of the Mold]

FIGS. 2A to 2F are a set of step diagrams illustrative of one embodiment of the manufacturing method of the inventive mold wherein the mold 1 shown in FIG. 1 is used as an example.

Figure 2A:
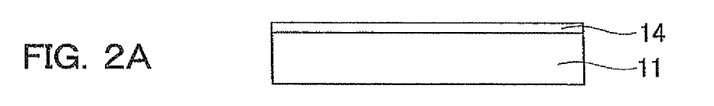
FIGS. 2A to 2F are a set of step diagrams showing one embodiment of the inventive mold manufacturing method.
Figure 2B:
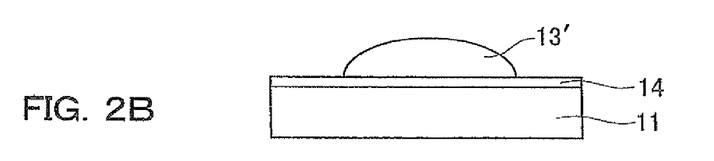

First, the raw material for forming the polydimethyl-siloxane layer 4 comprising the low-content polydimethyl-siloxane is coated on a support substrate 11 to form a coating film 14 (FIG. 2A). Given the low-molecular-weight siloxane of a cyclic structure represented by $[-Si(CH_3)_2O-]_k$ where k is an integer of 3 to 20 inclusive, the raw material used is a polydimethylsiloxane containing the low-molecular-weight siloxane in a smaller amount, for instance, a polydimethylsiloxane that has a low-molecular-weight siloxane content in the range of 1,000 ppm or less, preferably 0 to 500 ppm. For the support substrate 11, there may be a rigid substrate used such as a glass, quartz, silicon or metal substrate, and the surface to be provided with the coating film 14 should preferably be a flat surface having a surface average roughness Ra of, for instance, 0.1 µm or less in consideration of the thickness uniformity of the coating film 14 and the releasing feature of the support substrate 11 from the mold 1 in a later step. It is here to be noted that the surface average roughness Ra may be measured by an atomic force microscope (AFM).

The coating film 14 may be formed on the support substrate 11 as by spin coating or other suitable coating, and the thickness of the coating film 14 may optionally be determined such that the thickness of the polydimethylsiloxane layer 4 cured and formed in the later step comes under the range of 0.005 to 5 mm, preferably 0.05 to 1 mm. As the coating film 14 has a thickness such that the thickness of the polydimethyl-siloxane layer 4 cured and formed in the later step runs short of 0.005 mm, it may possibly give rise to defects in some of the polydimethylsiloxane layer 4 formed, which would in turn render it difficult to release the support substrate 11 from the mold 1 in the later step, and cause the mold 1 to rupture or otherwise break. As the coating film 14 has a thickness such that the thickness of the polydimethylsiloxane layer 4 exceeds 5 mm, on the other hand, it is not preferable in that the function of the polydimethylsiloxane layer 4 would not be enhanced any longer, and the manufacturing cost of the mold 1 would rise as well.

Figure 2C:
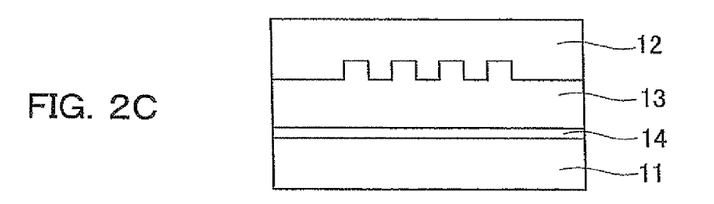
Figure 2D:
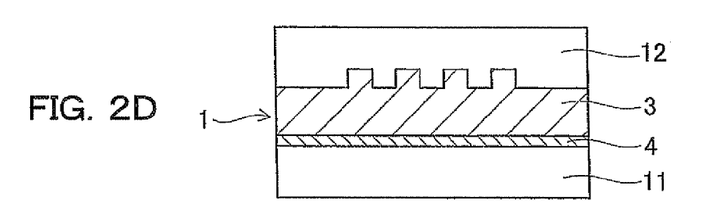

Then, a raw material 13' for the formation of the polydimethylsiloxane layer 3 comprising the high-content polydimethylsiloxane is fed onto the coating film 14 for the polydimethylsiloxane layer comprising the low-content polydimethylsiloxane (FIG. 2B), and a master template 12 is pressed against the raw material 13' thereby forming a coating film 13 for the polydimethylsiloxane layer containing the high-content polydimethylsiloxane between the master template 12 and the coating film 14 (FIG. 2C). The raw material 13' used here is a polydimethylsiloxane containing the low-molecular-weight siloxane in a larger amount, for instance, in the range of 2,000 ppm or more, preferably 5,000 to 30,000 ppm. By way of example but not by way of limitation, this raw material 13' may be fed onto the coating film 14, for instance, in a droplet form by means of a dispenser. The thickness of the coating film 13 may optionally be set such that the thickness of the mold 1 formed comes under the range of 0.5 to 10 mm, preferably 0.7 to 10 mm. As the coating film 13 has a thickness such that the thickness of the mold 1 becomes less than 0.5 mm, it would render mold manufacturing difficult because the high viscosity of the raw material 13' would give rise to thickness variations and ruptures of the mold 1 upon peeling from the support substrate 11. As the coating film 13 has a thickness such that the thickness of the mold 1 becomes greater than 10 mm, on the other hand, it is not preferable in that there is a precision drop of patterning by, for instance, imprinting or microcontact printing.

The master template 12 used herein may be formed of an inorganic material substrate used such as glass, quartz, silicon or metal substrate, and of a resinous material as well.

Figure 2E:
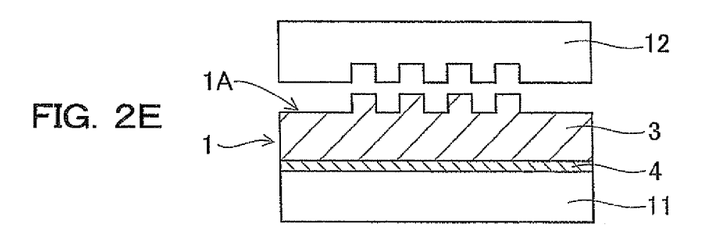
Figure 2F:
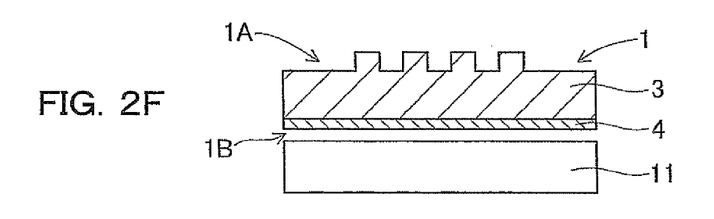

Then, the coating film 13 for the polydimethyl-siloxane layer comprising the high-content polydimethyl-siloxane and the coating film 14 for the polydimethyl-siloxane layer comprising the low-content polydimethyl-siloxane are cured (FIG. 2D), after which the master template 12 is released from the polydimethylsiloxane layer 3 (pattern-formation surface 1A) of the cured product (mold 1) (FIG. 2E).

Finally, the polydimethylsiloxane layer 4 (base surface 1B) is released from the support substrate 11 (FIG. 2F), whereby the inventive mold 1 is obtained.

Such an inventive mold manufacturing method allows the mold 1 to be easily handled in later steps such as an inspection step albeit being extremely soft, because the coating films 13 and 14 for the polydimethylsiloxane layers are cured between the support substrate 11 and the master template 12, and the master template 12 is released from the side of the pattern-formation surface 1A of the mold 1 to hold the mold 1 on the support substrate 11. In addition, because the polydimethyl-siloxane layer 4 (base surface 1B) of the mold 1 in contact with the support substrate 11 comprises the low-content polydimethyl-siloxane, the releasing of the mold 1 from the support plate 11 is easily achievable in a later step where the support substrate 11 is no longer in need, making sure the manufacturing of the inventive mold 1.

The aforesaid embodiments are given for the sake of exemplification, so the invention is not limited to them whatsoever. For instance, when between the polydimethyl-siloxane layers 3 and 4, there is the mold 1 further comprising a resinous material different from the high- and low-content polydimethylsiloxane layers, other resinous material as desired may be fed onto the coating film 14 for the polydimethylsiloxane comprising the low-content polydimethylsiloxane before the raw material 13' for the formation of the polydimethylsiloxane layer 3 containing the high-content polydimethylsiloxane is fed onto that coating film.

[Imprinting Using the Mold]

An exemplary imprinting process wherein the aforesaid mold 1 is used as the inventive mold will now be explained with reference to FIGS. 3A to 3D.

Figure 3A:
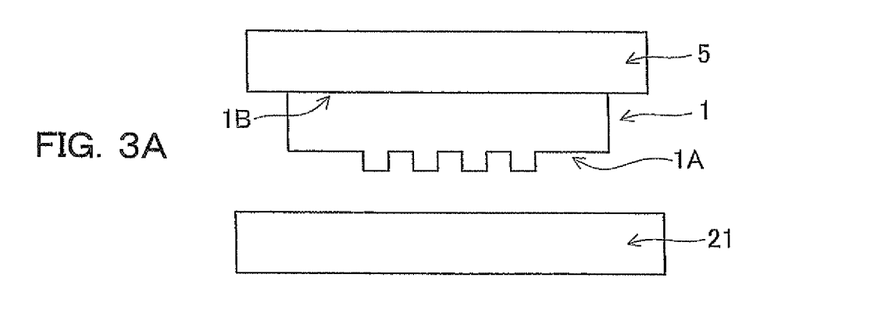
FIGS. 3A to 3D are a set of step diagrams showing one example of imprinting that makes use of the inventive mold.

The pattern-formation surface 1A of the mold 1 held on the mold holder 5 by means of retention by suction or the like is opposed to a transfer substrate 21 onto which the projection-and-depression structure of the pattern-formation surface 1A is to be transferred (FIG. 3A). For the transfer substrate 21, substrates generally available with imprinting may be used; for instance, there is the mention of substrates formed of glasses such as quartz, soda lime glass, and borosilicate glass, semiconductors such as silicon, gallium arsenide and gallium nitride, resins such as polycarbonate, polypropylene and polyethylene, and metals or composite materials comprising any combination thereof. Alternatively, use may also be made of substrates having thereon any desired pattern structure such as micro-wirings mounted on semiconductors, displays or the like, and optical structures such as photonic crystal structures, optical guides, and holograms.

Figure 3B:
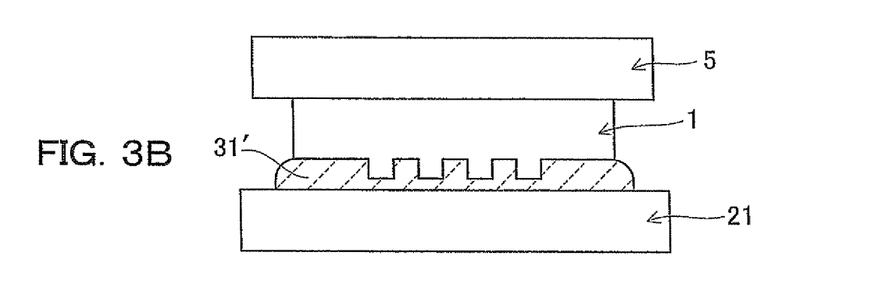
Figure 3C:
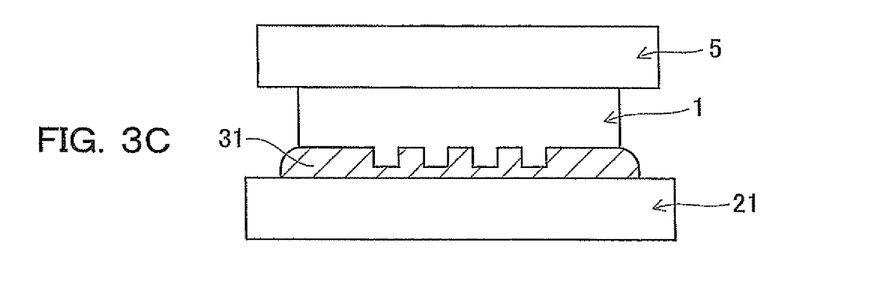

Then, an ultraviolet-curable imprinting resin 31' is fed onto the mold 1 or transfer substrate 21, after which the mold 1 is positioned in proximity to the transfer substrate 21 to fill micro-recesses in the projection-and-depression structure on the pattern-formation surface 1A with the imprinting resin 31' (FIG. 3B).

Figure 3D:
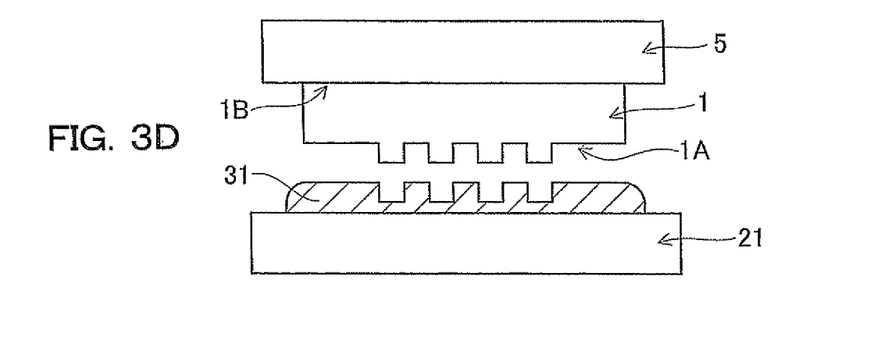

Finally, the imprinting resin 31' is irradiated and cured with ultraviolet from the side of the mold 1 or the transfer substrate 21 into a resin layer 31 (FIG. 3C), after which the cured resin layer 31 is taken apart from the mold 1 (FIG. 3D). It is thus possible to implement patterning thereby transferring onto the transfer substrate 21 the resin layer 31 having the projection-and-depression structure of the mold 1 in an inverted form.

In such an imprinting process, the inventive mold 1 enables good patterning to be implemented, because the pattern-formation surface 1A is so improved in terms of releasability that it can easily be released from the cured resin layer 31. In addition, the inventive mold 1 has the base surface 1B comprising the low-content polydimethylsiloxane so that even with the mold holder 5 formed of a silicon-containing material, sticking is prevented; that is, after the completion of a given number of imprinting cycles, the mold 1 could easily be separated from the mold holder 5, making sure good handleability.

In the aforesaid imprinting process, the ultraviolet-curable resin is used as an example; however, the invention is not limited thereto. For instance, use may be made of not only a thermosetting resin, a resin of the melt molding type or the like but also a molding material other than those resins.

[Microcontact Printing Using the Mold]

The microcontact printing using the inventive mold will now be explained with reference to FIGS. 4A to 4C wherein the aforesaid mold 1 is used as an example.

Figure 4A:
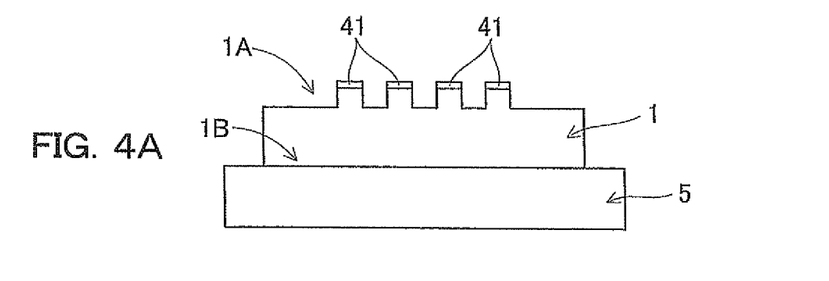
FIGS. 4A to 4C are a set of step diagrams showing one example of microcontact printing that makes use of the inventive mold.

First of all, an ink material 41 is placed on micro-projections on the pattern-formation surface 1A of the mold 1 held on the mold holder 5 by means of retention by suction or the like (FIG. 4A). If a material with, for instance, an electrically conductive material dispersed in a resin, is used as the ink material 41, patterning for wirings or the like on an electronic device may then be implemented. Alternatively, if a cell adhesion material such as collagen or a cell adhesion-inhibiting material such as polyethylene glycol is used as the ink material 41, it is then possible to implement patterning of cell adhesion areas, cell adhesion-inhibiting areas or the like in a cell pattern culture tool.

Figure 4B:
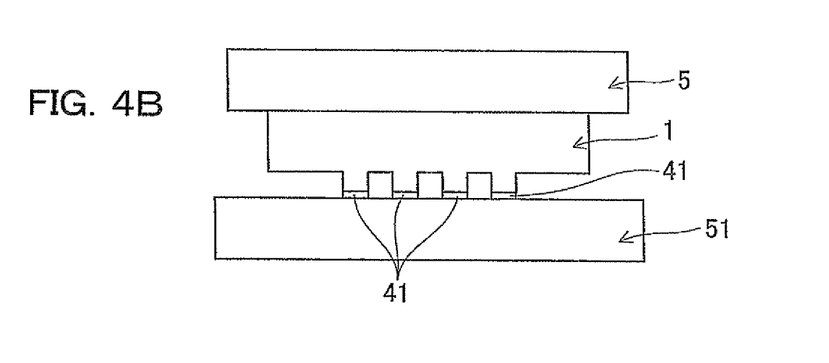

Then, a transfer substrate 51 is opposed to the pattern-formation surface 1A of the mold 1, and the mold 1 is placed in proximity to the transfer substrate 51 to let the ink material 41 abut on the transfer substrate 51 (FIG. 4B). For the transfer substrate 51, use may be made of a substrate generally used with microcontact printing, which may be either flexible or rigid.

Figure 4C:
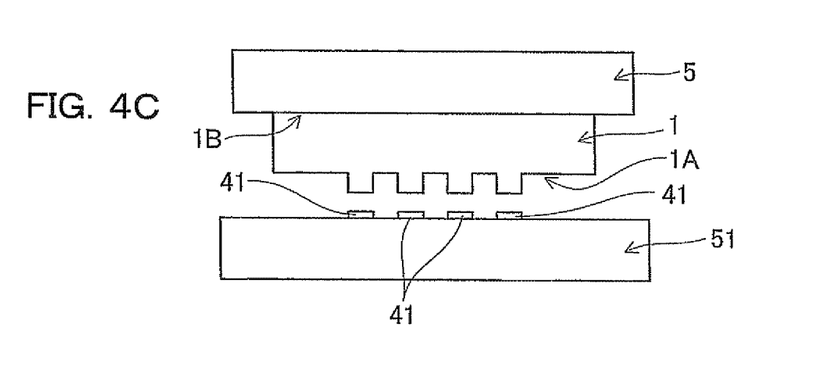

Finally, as the transfer substrate 51 is taken apart from the mold 1, it allows the ink material 41 to be transferred onto the transfer substrate 51 so that the desired pattern of the ink material 41 is formed on the transfer substrate 51 (FIG. 4C).

In such a microcontact printing process, the inventive mold 1 enables good patterning to be implemented, because the pattern-formation surface 1A is so improved in terms of releasability that it can easily be released from the ink material 41. In addition, the inventive mold 1 has the base surface 1B comprising the low-content polydimethylsiloxane so that even with the mold holder 5 formed of a silicon-containing material, sticking is prevented; that is, after the completion of a given number of microcontact printing cycles, the mold 1 could easily be separated from the mold holder 5, making sure good handleability.

By way of example but not by way of limitation, the present invention will now be explained in further details with reference to some specific examples.

Example 1

There was a silicon substrate of 0.625 mm in thickness and 150 mm in diameter provided as the support substrate. This support substrate was found to have a surface average roughness Ra of 0.001 µm as measured on AFM (L-Trace II made by Seiko Instruments Inc.).

After a polymerization initiator was mixed with a raw material A for the formation of a polydimethylsiloxane layer comprising the low-content polydimethylsiloxane, the mixture was spin coated on the aforesaid support substrate to form a coating film A. Given the low-molecular-weight siloxane of a cyclic structure represented by $[-Si(CH_3)_2O-]_k$ where k is an integer of 3 to 20 inclusive, that raw material A was a polydimethylsiloxane having a low-molecular-weight siloxane content of 1,000 ppm. The thickness of the coating film A was set such that the polydimethylsiloxane layer comprising the low-content polydimethylsiloxane formed by curing had a thickness of 0.1 mm.

Then, after a polymerization initiator was mixed with is a raw material B for the formation of a polydimethyl-siloxane layer comprising the high-content polydimethyl-siloxane, the mixture (20 grams) was added dropwise down to the aforesaid coating film A by means of a dispenser. This raw material B was a polydimethylsiloxane having a low-molecular-weight siloxane content of 2,000 ppm.

Then, the master template was pressed against the fed raw material B to form a coating film B for the polydimethylsiloxane layer comprising the high-content polydimethylsiloxane between the master template and the coating film A. Thereafter, the coating films A and B were cured at 150° C. for 30 minutes into a cured product (mold), which was in turn released from the master template. Afterwards, the cured product (mold) was released from the support substrate to obtain the mold of 1.5 mm in thickness by itself. This mold was found to have on its projection-and-depression structure area a projection-and-depression structure pattern including a line/space of 50 nm and 50 nm.

Example 2

Example 1 was repeated with the exception that a polydimethylsiloxane having a low-molecular-weight siloxane content of 7,000 ppm was used as the raw material B for the formation of the polydimethylsiloxane layer comprising the high-content polydimethylsiloxane, thereby preparing a mold.

Example 3

Example 1 was repeated with the exception that a polydimethylsiloxane having a low-molecular-weight siloxane content of 200 ppm was used as the raw material A for the formation of the polydimethylsiloxane layer comprising the low-content polydimethylsiloxane, thereby preparing a mold.

Comparative Example 1

Example 1 was repeated with the exception that a polydimethylsiloxane having a low-molecular-weight siloxane content of 200 ppm was used as the raw material A for the formation of the polydimethylsiloxane layer comprising the low-content polydimethylsiloxane and a polydimethylsiloxane having a low-molecular-weight siloxane content of 1,000 ppm was used as the raw material B for the formation of the polydimethylsiloxane layer comprising the high-content polydimethylsiloxane, thereby preparing a mold.

Comparative Example 2

Example 1 was repeated with the exception that a polydimethylsiloxane having a low-molecular-weight siloxane content of 1,500 ppm was used as the raw material A for the formation of the polydimethylsiloxane layer comprising the low-content polydimethylsiloxane, thereby preparing a mold.

Comparative Example 3

Example 1 was repeated with the exception that a polydimethylsiloxane having a low-molecular-weight siloxane content of 1,300 ppm was used as the raw material A for the formation of the polydimethylsiloxane layer comprising the low-content polydimethylsiloxane and a polydimethylsiloxane having a low-molecular-weight siloxane content of 1,700 ppm was used as the raw material B for the formation of the polydimethylsiloxane layer comprising the high-content polydimethylsiloxane, thereby preparing a mold.

[Estimation]
(Releasability)

How the mold was released from the support substrate in the aforesaid mold preparation was observed to make estimation of releasability on the following criteria. The results are set out in Table 1 given later.

(Estimation Criteria)

◯: None of the mold remained sticking to the support substrate.

x: Some of the mold remained sticking to the support substrate.

(Stability)

The mold prepared as described above was placed and maintained on a silicon substrate for 120 days while its polydimethylsiloxane layer side (base surface) comprising the low-content polydimethylsiloxane was kept abutting onto it, after which whether or not the mold remained sticking to the silicon substrate was observed. The results are set out in Table 1 given just below.

(Water Repellency)

The mold prepared as described above was measured in terms of the angle of contact with water of the side of the polydimethylsiloxane layer of the mold comprising the high-content polydimethylsiloxane. The results are set out in Table 1 given later. Note here that the angle of contact with water was measured by means of an angle-of-contact meter (CA-Z Model made by Kyowa Interface Science Co., Ltd.) 30 seconds after water was added dropwise down to the mold through a micro-syringe at a temperature of 25° C. and a humidity of 30% under atmospheric pressure.

(Imprinting Capability)

Using the mold prepared as described above, patterning was implemented as follows. That is, a photo-curable resin (PAK-01 made by Toyo Gosei Co., Ltd.) was added dropwise down to a 0.8-mm thick silicon substrate having an angle of contact with water of 22°, and the mold was pressed against that photo-curable resin. In this state, the resin was cured by irradiation from the side of the mold with parallel light (ultraviolet having a peak wavelength of 365 nm) leaving a lighting optical system of an imprinting apparatus. Thereafter, the mold was taken apart from the cured resin layer for the completion of imprinting.

The thus formed pattern was measured in terms of the percent defect as follows. The results are set out in Table 1 given just below.

(Measurement of the Per Cent Defect)

The formed pattern area was observed at five sites under an optical microscope, and within each sites under observation (1.0 mm×1.0 mm), there was the area proportion measured in which de-bonding of the resin layer and pattern defects were found with sure. As the percent defect grows high, it means that there are more defects occurring. In the invention, a percent defect of less than 0.1 is taken as a practical level, i.e., good imprinting capability.

TABLE 1

| Mold | Low-molecular-weight siloxane content (ppm) | | Releasability | Stability | Water repellency (°) | Imprinting capability |
| --- | --- | --- | --- | --- | --- | --- |
| | Raw material A | Raw material B | | | | |
| Example 1 | 1,000 | 2,000 | ◯ | No sticking | 105 | Good |
| Example 2 | 1,000 | 7,000 | ◯ | No sticking | 110 | Good |
| Example 3 | 200 | 2,000 | ◯ | No sticking | 105 | Good |
| Comparative Example 1 | 200 | 1,000 | ◯ | No sticking | 90 | Poor |
| Comparative Example 2 | 1,500 | 2,000 | X | Some sticking | 105 | Good |
| Comparative Example 3 | 1,300 | 1,700 | X | Some sticking | 95 | Poor |

What is claimed is:

1. A mold having a first side that includes a pattern-formation surface, the pattern-formation surface having a projection-and-depression structure area for patterning, and a second side that includes a base surface, wherein at least the first side and the second side each comprise a polydimethylsiloxane, and wherein given a low-molecular-weight siloxane of a cyclic structure represented by $[-Si(CH_3)_2O-]_k$ where k is an integer of 3 to 20 inclusive, a content of the low-molecular-weight siloxane in the polydimethylsiloxane of the first side is more than a content of the low-molecular-weight siloxane in the polydimethylsiloxane of the second side.

2. The mold as recited in claim 1, wherein the polydimethylsiloxane of the first side contains the low-molecular-weight siloxane in an amount of 2,000 ppm or more, and the polydimethylsiloxane of the second side contains the low-molecular-weight siloxane in an amount of 1,000 ppm or less.

3. The mold as recited in claim 1, wherein the polydimethylsiloxane of the second side is a layer having a thickness ranging from 0.005 to 5 mm.

4. The mold as recited in claim 1, wherein the pattern-formation surface has an angle of contact with water of 100° or greater.

5. A manufacturing method of a mold, wherein a low-molecular-weight siloxane of a cyclic structure is represented by $[-Si(CH_3)_2O-]_k$ where k is an integer of 3 to 20 inclusive, the method comprising:

forming a second side of the mold, the second side including a base surface of the mold, by coating a support substrate with a polydimethylsiloxane optionally containing the low-molecular-weight siloxane, forming a first side of the mold that includes a pattern-formation surface of the mold, by feeding a polydimethylsiloxane containing the low-molecular-weight siloxane onto the formed second side of the mold and pressing a master template against the fed polydimethylsiloxane to thereby form, between the polydimethylsiloxane of the second side of the mold and the master template, the first side of the mold, wherein a content of the low-molecular-weight siloxane in the polydimethylsiloxane of the first side is more than a content of the low-molecular-weight siloxane in the polydimethylsiloxane of the second side, curing the polydimethylsiloxane of the second side and the polydimethylsiloxane of the first side, after which the master template is released from the pattern-formation surface of the first side of the mold, and releasing the support substrate from the base surface of the second side of the mold.

6. The mold manufacturing method as recited in claim 5, wherein the polydimethylsiloxane of the second side contains the low-molecular-weight siloxane in an amount of 1,000 ppm or less, and the polydimethylsiloxane of the first side contains the low-molecular-weight siloxane in an amount of 2,000 ppm or more.

7. The mold as recited in claim 2, wherein the polydimethylsiloxane of the second side is a layer having a thickness ranging from 0.005 to 5 mm.

8. The mold as recited in claim 2, wherein the pattern-formation surface has an angle of contact with water of 100° or greater.

* * * * *